Sept. 23, 1941.  A. E. W. JOHNSON  2,256,830
PICK-UP BALER
Filed March 2, 1939   2 Sheets-Sheet 2

Inventor
Arnold E. W. Johnson
By Paul O. Pippel
Att'y.

Patented Sept. 23, 1941

2,256,830

UNITED STATES PATENT OFFICE 2,256,830

PICKUP BALER

Arnold E. W. Johnson, Chicago, Ill., assignor to International Harvester Company, a corporation of New Jersey Application March 2, 1939, Serial No. 259,413

6 Claims. (Cl. 56—364)

This invention relates to a pick-up baler construction. More specifically it relates to the pick-up unit of such construction.

In the case of a pick-up baler construction which has the usual baling unit, cross conveyer, and pick-up unit, the usual practice is to support the pick-up unit upon a wheel supported axle positioned beneath the cross-conveyer. In such a case, the pick-up unit is pivoted about the axle as a center. With this arrangement a satisfactory adjustment of the pick-up unit is somewhat difficult because the effective center of gravity of the unit is so far removed from the pivot axis. According to the present invention, a structure is attached to the axle and extends away from the axle to form a support for the pick-up unit spaced from the axle, which is under the pick-up unit.

The normal way of driving the pick-up unit has been either at constant speed from a convenient source of power or at ground. With the present invention, drive of the pick-up cylinder is from a ground wheel and drive of the conveyer from a source of power.

An object of the present invention is to provide a support for a pick-up unit spaced from the transverse axle of a pick-up baler.

Another object is the provision of a structure extending from the transverse axle of a pick-up baler for providing a pivotal support for the pick-up unit.

A further object of the invention is to provide a pivotal support for a pick-up unit under the unit.

Still another object is the provision of an improved drive for the pick-up cylinder and conveyer of the pick-up unit.

According to the present invention, a pick-up unit is pivotally supported at a point spaced from the transverse axle of a pick-up baler by means of an X-frame construction. One member of the X-frame has an end attached to the transverse axle and the other end attached to the baler unit frame. The other member has an end attached to the baler unit frame adjacent the axle and is connected at its mid-section to a mid-section of the first member. A shaft is supported in the other end of the first member and in the baler unit frame at a point adjacent the attachment of the first member. A bracket member is sleeved upon the shaft and has an arm extended to a connection with the pick-up unit. Adjustment of the pick-up unit is had by a pivoting of the bracket member about the shaft. A ground wheel drives the pick-up cylinder at ground speed, and a source of power drives the conveyer of the pick-up unit at a constant speed.

Figure 1:
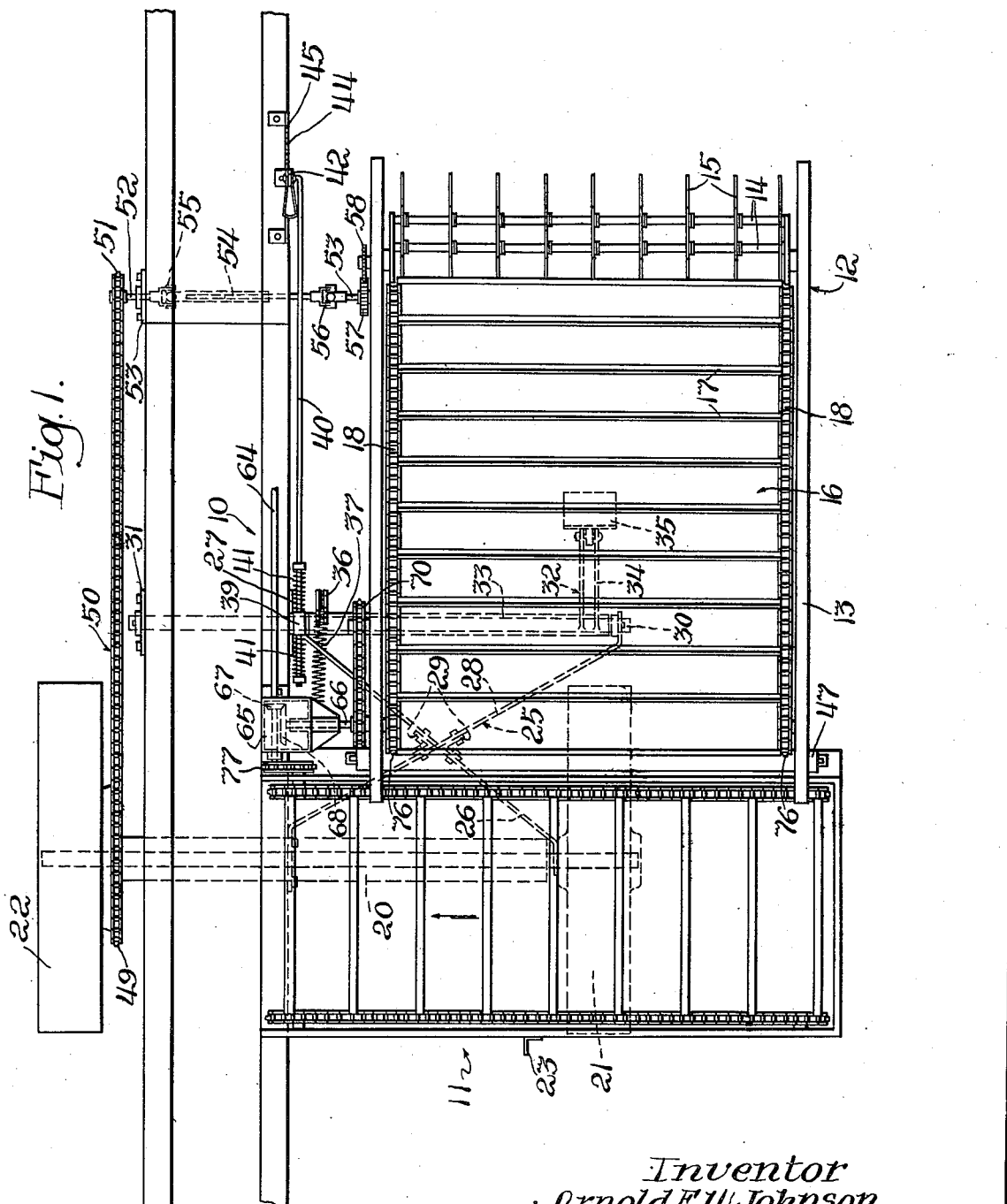
Figure 1 is a plan view of the novel pick-up baler construction.
Figure 2:
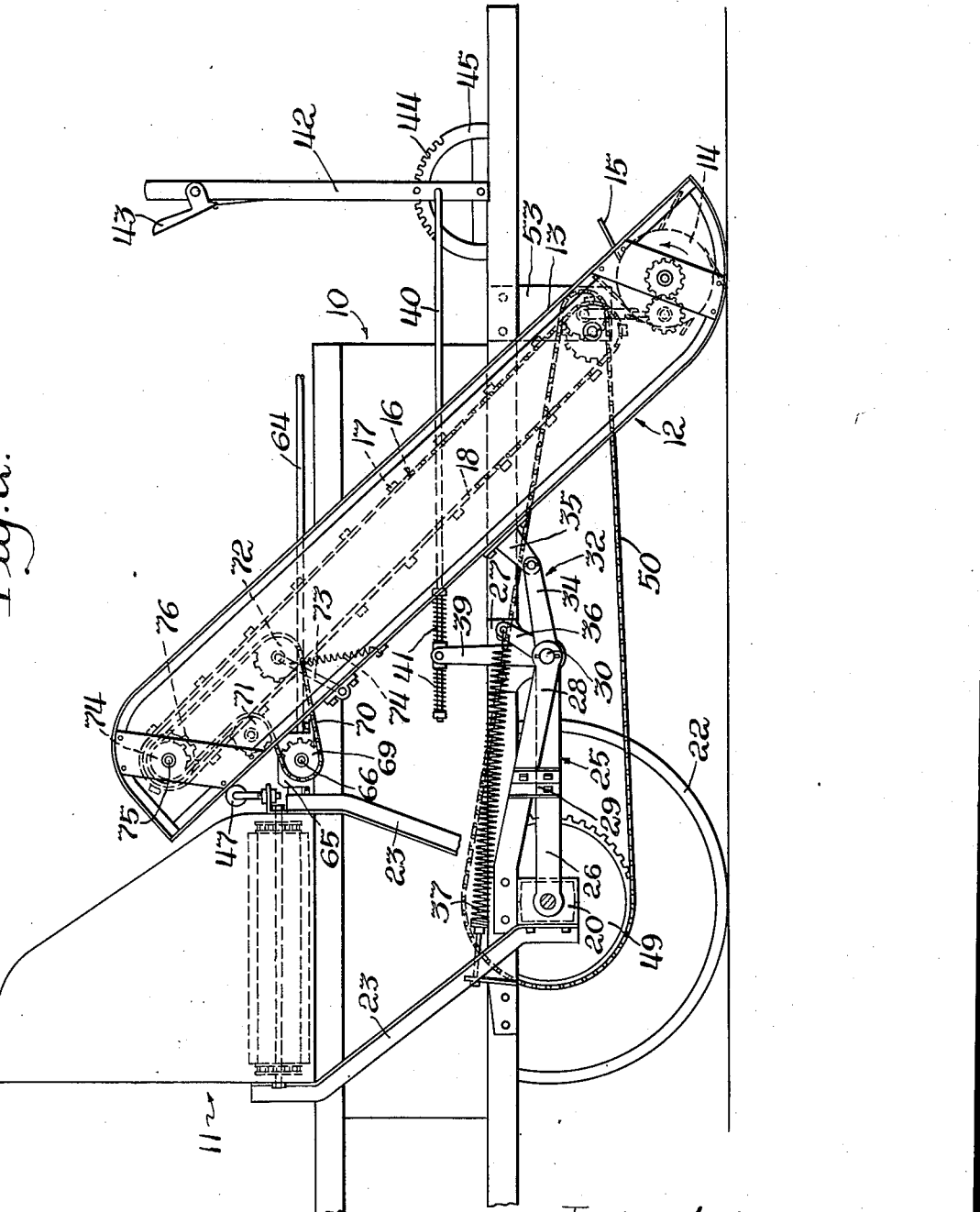
Figure 2 is a side view of the same construction with a wheel removed.

The pick-up baler of the present invention comprises a baler unit 10 of which only the framework is shown, a cross-conveyer 11, and a pick-up unit 12. The pick-up unit comprises essentially a frame or body 13, a pick-up device in the form of a cylinder 14 at the lower end thereof having tines 15, a conveyer 16 having spaced slats 17 attached to sprocket chains 18. The baler unit 10 and the cross-conveyer 11 are supported by means of a transverse axle 20 having at its ends wheels 21 and 22. Angle members 23 extend from the end of the axle 20 adjacent the wheel 21 to support one end of the cross-conveyer 11.

An X-frame designated generally by the numeral 25 extends from the axle 20 to form a pivotal support for the pick-up unit 12 spaced from the axle. A member 26 of the X-frame has one end attached to the axle 20 adjacent the wheel 21 and the other end attached to the framework of the baler unit 10 by means of a bracket 27. A second member 28 of the X-frame 25 has one end attached to the baler unit framework at a point substantially over the axle 20 and is supported at its mid-section by the member 26 by extending across the member 26. Angle members 29 attach the two members at their mid-sections. The free end of the member 28 is opposite the end of the member 26 attached to the baler unit framework. This free end supports one end of a shaft 30 which is supported at its other end in the bracket 27 to which the one end of the member 26 is attached and also in a bracket 31 attached to the baler unit framework.

A bracket member 32 has a sleeve portion 33 journaled upon the shaft 30. An arm 34 of the bracket member extends to a pivotal connection with a bracket 35 fixed to the underside of the pick-up unit 12. An arm 36 is fixed to the sleeve 33 and is connected to the baler unit framework by means of a counterbalancing spring 37. An arm 39 is also attached to the sleeve 32 and has a yielding connection with a rod 40 through cushioning springs 41. The rod 40 is in turn connected to an adjusting lever 42 pivoted on the baler unit framework and having detent mechanism 43 engageable with the toothed portion 44 of an arcuate member 45. It will be seen that angular adjustment of the pick-up unit 12 is effected through adjustment of the lever 42 with consequent adjustment of the rod 40, the arm 39, and the bracket member 32.

With this arrangement, adjustment of the pick-up unit is made about the shaft 30 as an axis rather than the axle 20. The upper end of the pick-up unit 12 rides upon a roller 47 extending the width of the pick-up unit and supported upon the cross-conveyer 11.

Drive of the cylinder 14 is effected through rotation of the wheel 22 and consequently the cylinder rotates in proportion to ground speed. A gear 49 is mounted on the axle 20 and drives a chain 50 which in turn drives a gear 51 fixed to the end of a stub shaft 52 mounted in a hanger 53 attached to the baler unit framework. The shaft 52 is connected to a stub shaft 53 mounted in the baler unit 10 by means of a telescoping shaft 54 and a pair of universal joints 55 and 56. A gear 57 on the shaft 53 drives a gear 58 secured to the cylinder 14.

Drive of the conveyer 16 of the pick-up unit 12 originates with a shaft 64 which may be driven by a suitable source of power, not shown. This shaft enters a gear box 65 and drives a stub shaft through the medium of a gear 67 which meshes with a gear 68 on the shaft 66. A gear 69 is mounted on the shaft 66 and drives a chain 70 which meshes with an idler gear 71 and an idler gear 72 supported on an arm 73 controlled by a spring 74. The chain 70 drives a gear 74 mounted on a shaft 75 at the upper end of the pick-up unit 12. The shaft 75 drives gears 76 mounted thereon which in turn drive sprocket chains 18 of the conveyer 16. Shaft 64 also drives chain 77 through a gear on the end of the shaft meshing with the chain. The chain meshes with another gear mounted on a shaft of the cross conveyer 11, thereby driving the cross conveyer.

Operation of the pick-up baler is as follows: As the unit moves over the ground, the cylinder 14 and tines 15 pick up cut material such as hay, which preferably has previously been formed in a windrow, and deposits it upon the conveyer 16 which carries it upwards and drops it on the cross-conveyer 11. The cross-conveyer 11 carries the material into the baler unit 10 where the material is made into bales. As previously stated, adjustment of the pick-up unit is effected through shifting of the lever 42 which, through the medium of the rod 40 and the arm 39, rotates the bracket member 32 about the shaft 30. The arm 34 is also rotated and because of its connection with the pick-up unit through the bracket 35, the pick-up unit is adjusted.

From the above description, it will be seen that a novel pick-up baler construction has been provided by which the pick-up unit is pivotally supported about the shaft 30 which is spaced a considerable distance from the transverse axle 20. It is much more convenient to have the adjustment made from the position of the shaft 30 which is directly under the pick-up unit, rather than the axle 20 which is substantially removed from the pick-up unit. A novel X-frame construction provides for the support of the shaft 30 in spaced relation to the axle 20.

There is considerable advantage in the arrangement of power drive for the pick-up conveyer and ground drive for the pick-up roller. With ground drive for the pick-up roller, gathering of the cut material is in proportion to the ground speed of the machine. At times big bunches of hay may be picked up which tend to clog the baler and conveyers. In such cases the machine may be stopped; accordingly, pick-up of material is stopped because of stopping of the pick-up roller. The pick-up conveyer continues to run, however, because it is driven from a separate source of power. The machine quickly clears itself of any clogging mass, and picking up of material is again begun.

It is to be understood that the invention is to be limited only within the terms of the appended claims.

What is claimed is:

1. In combination, a mobile type baler including a driving connection adapted to be connected to a source of power to drive the baler, a transverse conveyer supported at one side of the baler, a pick-up unit adjustably supported at one side of the baler, said pick-up unit having a pick-up cylinder adapted to pick-up cut material from the ground and a conveyer adapted to convey the cut material from the pick-up cylinder onto the transverse conveyer, means for driving the pick-up conveyer from said driving connection, and means separate from the driving connection for driving said pick-up cylinder from the movement of the baler over the ground.

2. In combination, a wheel supported baler including a driving connection adapted to be connected to a source of power to drive the baler, a transverse conveyer supported at one side of the baler, a pick-up unit adjustably supported at one side of the baler, said pick-up unit having a pick-up device adapted to pick-up cut material from the ground and a conveyer adapted to convey the cut material from the pick-up device onto the transverse conveyer, means for driving the pick-up conveyer from said driving connection, and means separate from the driving connection for driving said pick-up device from the wheel supported baler.

3. In combination, a wheel supported baler including a driving connection adapted to be connected to a source of power to drive the baler, a transverse conveyer supported at one side of the baler, a pick-up unit adjustably supported at one side of the baler, said pick-up unit having a pick-up device adapted to pick-up cut material from the ground and a conveyer adapted to convey the cut material from the pick-up device onto the transverse conveyer, means for driving the pick-up conveyer and the transverse conveyer from said driving connection, and means for driving said pick-up device from the wheel supported baler.

4. A pick-up unit for a mobile pick-up baler comprising a frame, a pick-up cylinder mounted on said frame and adapted to pick up cut material from the ground, a conveyer mounted on said frame and adapted to convey the cut material from said pick-up cylinder, means for driving the pick-up cylinder from the movement of the construction over the ground, and means for driving the pick-up conveyer at a constant speed.

5. A pick-up unit having a frame adapted to be adjustably supported on a mobile pick-up baler, a pick-up cylinder mounted on said frame and adapted to pick up cut material from the ground, an elevating conveyer mounted on said frame and adapted to convey the cut material from said pick-up cylinder, means for driving the pick-up cylinder from the movement of the construction over the ground, and means for driving the pick-up conveyer at a constant speed.

6. A pick-up unit for a mobile pick-up baler comprising a frame, a pick-up device mounted on said frame and adapted to pick up cut material from the ground, an elevating conveyer mounted on said frame and having one end thereof positioned adjacent the pick-up device so as to convey the material from said pick-up device, means for driving the pick-up device from the movement of the construction over the ground, and means for driving the elevating conveyer at a constant speed.

ARNOLD E. W. JOHNSON.